Oct. 20, 1959  E. J. HOUDRY  2,909,415
CATALYTIC EXHAUST PURIFIER
Filed June 22, 1954  2 Sheets-Sheet 1
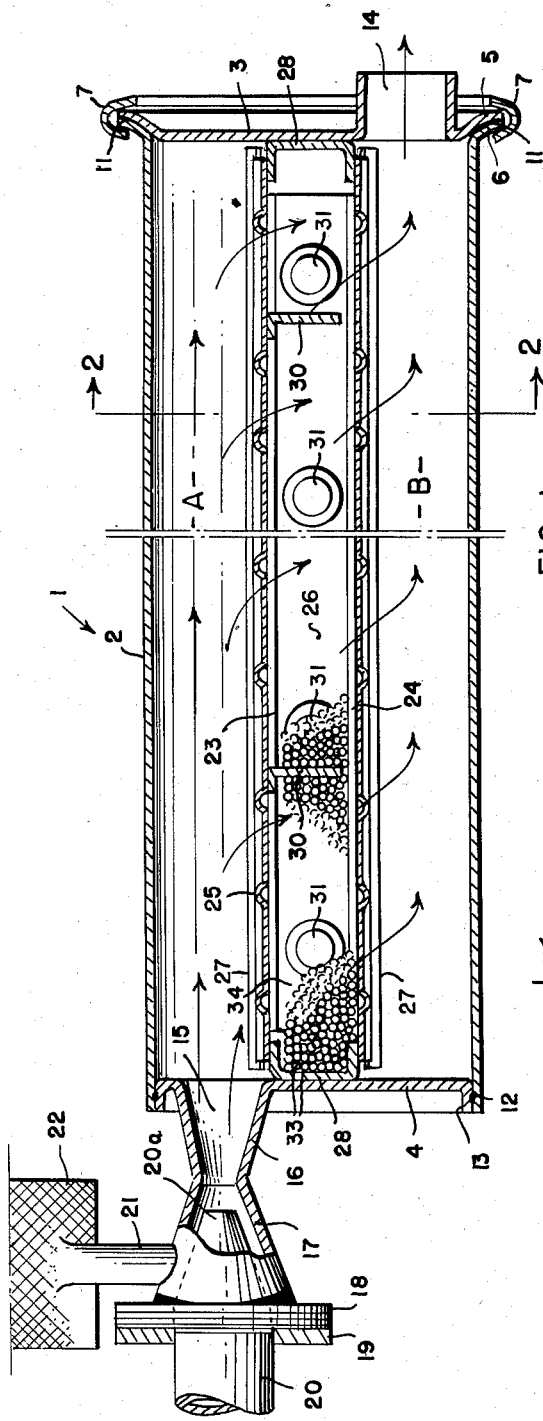
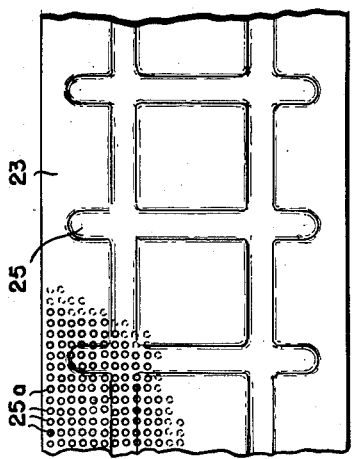
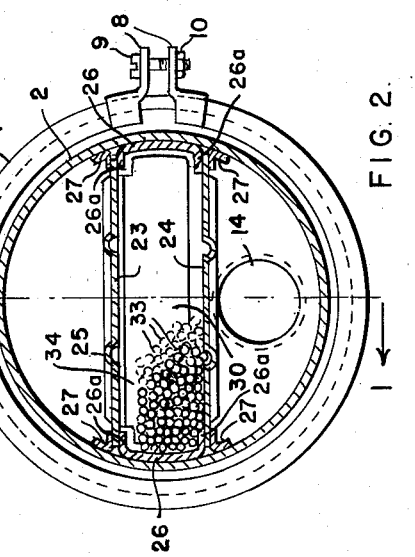
INVENTOR.
EUGENE J. HOUDRY
BY
ATTORNEY

INVENTOR.
EUGENE J. HOUDRY
BY
ATTORNEY

2,909,415
CATALYTIC EXHAUST PURIFIER

Eugene Jules Houdry, Ardmore, Pa., assignor to Oxy-Catalyst, Inc., a corporation of Pennsylvania Application June 22, 1954, Serial No. 438,423

2 Claims. (Cl. 23—288)

This invention relates to catalytic devices of the type usable with an internal combustion engine for oxidizing toxic and obnoxious components therefrom. The exhaust gases of conventional gasoline and diesel engines for example contain objectionable components in the form of carbon monoxide, hydrocarbons, free carbon, aldehydes, acids and free hydrogen. Carbon monoxide is highly toxic and will cause death when present in the atmosphere in concentrations as low as 0.01%, while the hydrocarbons and oxygenated organic compounds contained in exhaust gases are known to be dangerous to health. Recent workers have in fact reported the isolation of carcinogenic compounds from automotive exhausts.

The nuisance and health menace created by the exhaust gases of internal combustion engines has inspired the invention of many devices during the past forty years for its abatement. One of the most common types of proposed cleaners for engine exhaust gases comprises a catalytic muffler capable of oxidizing the toxic and obnoxious components of the gases to produce carbon dioxide, an innocuous gas, and water vapor. The basic concept of catalytic mufflers is sound, but the difficulty of producing a practical and efficient device of this type has prevented their adoption on an appreciable scale, and thus very few engines today are equipped with any sort of exhaust purifier.

The problems which must be overcome to provide a commercially acceptable catalytic exhaust purifier are many and varied. An active and durable and yet inexpensive oxidation catalyst must be provided. A mechanical structure must be provided for supporting a catalyst properly capable of withstanding high and rapidly fluctuating temperatures. The device must not be excessively large in size nor of excessive weight. No undue back-pressure should be imposed upon the engine. The device must be capable of functioning efficiently and for long periods of time under a great variety of operating conditions, particularly when installed upon road vehicles.

One particularly important aspect of the general problem of producing an acceptable catalytic muffler is that of the arrangement of the catalyst in such manner that a minimum of back-pressure is imposed upon the engine while at the same time uniform and efficient contact between the exhaust gases and the catalyst surface is maintained. It is with this particular aspect that this invention is concerned.

Generally speaking, two types of catalyst arrangement have been employed in catalytic mufflers. The first involves the use of fixed elements arranged in spaced apart relationship to one another, such as a number of perforated discs or rods. The second involves the use of a bed of pellets of uniform or irregular shape composed of catalytic material disposed at random in a container through which the exhaust gases pass. It is with this second type of catalyst arrangement that this invention is concerned.

When employing a catalyst arrangement of this second type, that is a bed of catalytic pellets, in a catalytic muffler, it has been found that there is considerable difficulty in maintaining a low pressure drop through the catalyst bed (and thus low back-pressure on the engine) while at the same time maintaining uniform and efficient contact between the exhaust gases and the bed of catalyst under all of the great variety of operating conditions which accompany the application of a catalytic muffler to a road vehicle. The catalyst bed is first of all subjected to constant vibration, jars, shocks and tilting in all directions due to the vibration of the engine and the passage of the vehicle over the road. The volume and temperature of the exhaust gases entering the catalyst bed undergoes constant variation depending upon the speed and load condition of the engine causing the catalyst itself and its supporting structure to undergo continual temperature variations, and accordingly continual thermal expansion and contraction. The catalyst bed is furthermore constantly subjected to the introduction of foreign solid particles emanating from the engine itself or from road dust.

Due to this combination of rigorous conditions, coupled with the necessity for maintaining low back-pressure and a uniform and efficient contact between the exhaust gases and the catalyst, the physical arrangement of the catalyst bed becomes a matter of critical importance. Because of the constant and often relatively violent movement to which the catalyst housing is subjected, the catalyst pellets must be confined on all sides to prevent their escape and to maintain a catalyst bed of substantially constant shape and dimensions. At the same time it has been found that provision must be made to avoid crushing of the catalyst pellets by the catalyst confining means as a result of the differing rates of expansion and contraction of the pellets and the metal container in which they are confined. The catalyst pellets are ordinarily composed of a material having a relatively low heat conductivity and relatively low coefficient of expansion compared to their metal container. On heating and cooling consequently, the container will expand and contract at a much faster rate than the catalyst bed, and with accompanying relatively rapid change in dimensions, on cooling particularly may tend to crush the catalyst pellets.

In addition to these considerations it has been found that the bed of catalyst pellets must be so disposed that it retains a maximum of permeability consistent with most efficient gas-catalyst surface contact under constant vibration and violent shocks and jars, and that in addition uniform flow through all sections of the bed must be always maintained. Thus, the bed of pellets must be so physically arranged that all portions of the bed are maintained at substantially uniform thickness in the direction of gas flow; packing of the pellets in localized sections of the bed must be avoided; the accumulation of small particles originating from the engine exhaust itself, from road dust or from attrition of the catalyst pellets must be prevented to avoid localized clogging of the interstices of the particles. Packing, that is to say the manner in which the pellets are arranged with respect to one another, or oriented in different portions of the bed, can effect the permeability of the bed to a marked degree. Should, for example, the pellets in one portion of the bed assume a close-packed orientation, and a relatively loosely-packed orientation in another, the free area for the flow of the exhaust gases in the close-packed portion may be considerably smaller, resulting in non-uniform flow through the bed as a whole. Clogging of the bed through the accumulation of small particles in interstices of the bed can render portions of the bed or the entire bed substantially impermeable to the flow of exhaust gases.

It is the object of this invention to provide a catalytic muffler having a bed of catalyst pellets so arranged as to impose a minimum of back-pressure upon the engine and at the same time provide for uniform and efficient contact of the exhaust gases with the catalyst surface. Specifically, it is the object of the invention to provide such a device in which the bed of catalytic pellets is so arranged as to maintain these advantageous characteristics of low back-pressure and efficiency of gas-catalyst contact under all operating conditions accompanying the use of such devices on road vehicles, particularly those operating on leaded gasoline or other such fuels emitting relatively large quantities of foreign solid particles. Other objects of the invention will be apparent from the description which follows.

According to the invention, these objects are accomplished and the difficulties discussed above are overcome by providing a catalytic muffler having a bed of catalyst pellets arranged in a horizontally disposed layer having a thickness which is relatively small in contrast to its surface (that is, lateral and longitudinal) dimensions, such layer being so arranged within its confining means that the individual pellets are free to continually change their position in the layer and relative to one another in response to the vibrations and movement to which the catalyst housing is subjected during operation of the vehicle, or in response to movement caused by the flow of the exhaust gases through the layer but such that the layer remains of substantially uniform thickness under this vibration and movement. This arrangement is preferably accomplished by confining the layer of catalyst pellets between a pair of horizontally disposed foraminous sheets, the major portion of but not the entire space therebetween being filled with catalyst pellets, sufficient void space being left to permit the desired free movement of the pellets without at the same time substantially effecting the uniformity of bed thickness under operating conditions.

This arrangement of the catalyst bed has the following advantages. First of all, the disposition of the catalyst pellets in a relatively thin layer (that is to say an arrangement in which the volume of catalyst pellets necessary to effect the desired oxidation of obnoxious components in the exhaust gases is disposed in a layer whose thickness is small relative to the surface dimensions of the layer) has the important advantage of minimizing the back-pressure imposed by the catalyst. This follows from the fact that pressure drop through a layer of catalyst pellets of given volume and with a given flow of exhaust gases is proportional approximately to the square of its thickness. That is, in such circumstances, if the thickness should double (thus halving the area of the layer), the pressure drop through the layer would quadruple. Secondly, this arrangement minimizes or completely eliminates the tendency of the catalyst pellets to be crushed by their container during expansion and contraction thereof. Such crushing often occurs in a relatively deep catalyst bed, where the catalyst pellets have a strong tendency to become tightly packed, as a result of the rapid expansion of the metal container during use of the catalytic muffler when temperatures as high as 1400° F. are attained, followed by its relatively rapid contraction on cooling. When the pellet bed is relatively deep the pellets are unable, in effect, to properly accommodate to the changing cross-sectional area of the container. That is to say, as the lateral walls of the container move in, so to speak, during cooling, the deep catalyst bed is unable to "flow" and instead the pellets tend to bind against one another and lock into a tight matrix with the result that crushing takes place. In a relatively thin layer on the other hand, where the ratio of thickness to horizontal cross-sectional area is relatively small, this tendency for the catalyst pellets to become locked is greatly reduced, and crushing from this factor is virtually eliminated.

Thirdly, the freedom of movement of the catalyst pellets permitted by this arrangement is essential to maintaining uniform permeability of the catalyst bed under the conditions inherent in the operation of a catalytic muffler attached to a road vehicle. With each vibration, jar or sudden movement to which the catalyst layer is continually subjected, each or a large proportion of the catalyst pellets are shifted to a new position and/or orientation in the layer and with respect to its neighbors, thus making it statistically impossible for the pellets in any portion of the bed to settle into a close-packed arrangement, as is likely to occur in a tightly packed bed where the pellets are only able for example to vibrate to and fro in substantially the same location. Accumulation of small particles in the catalyst bed is likewise prevented by this continual movement of the pellets since such particles can lodge only within crevices between stationary pellets and such crevices are destroyed momentarily with each vibration or jar to which the catalyst layer is subjected. Such particles consequently travel quickly through the bed and leave in the stream of exhaust gases. The problems connected with foreign particles in the exhaust gas stream are particularly serious when a so-called "leaded" gasoline is employed as the engine fuel. The tetra-ethyl lead used in most commercial gasolines to increase the octane rating decomposes in the engine and is emitted in the engine exhaust as particles of lead oxide, lead sulphate, lead bromate, etc. Besides clogging of the interstices of the catalytic bed, the accumulation of these particles in the bed is undesirable for other reasons. It has been found, for example, that the lead compounds, lead oxide particularly, tends to coat the surfaces of the catalytic pellets and thereby render the catalyst inactive. Accordingly, the more permeable the bed of pellets can be maintained to the passage of these particles, the less tendency there will be for this coating of the catalyst pellets to take place. It has also been found that the coating of lead oxide on the pellets occurs by melting of the lead oxide particles on the hot surface of the pellets. Accordingly, the shorter the residence time for these particles, the less possibility for this melting to take place. In this same regard, the movement of the pellets over and against one another and against the sides of their container assists in keeping their surfaces clean of such deposits by the scraping, scouring or similar action accompanying such movement.

To achieve the full advantages of the invention the catalyst pellets should be relatively small in size and have smooth and rounded surfaces and preferably be of relatively uniform size and shape. Such characteristics insure that the layer of pellets will respond readily and uniformly to the vibrations and movement to which it is subjected during operation of the vehicle. Specifically, the pellets should have average dimensions of at least 1/32" and not greater than about 1/4" and preferably from 1/16" to 1/8". They are preferably in the form of cylinders, spheres or the like having smooth and rounded surfaces which will roll freely over one another. In the case of cylinders, most desirably the diameter of the cylinder should approximately be the same as its length. A bed of pellets made up for example of cylinders 3/32" in diameter and of the same length, and all approximately the same size and shape has been found to be ideally suited for use in accordance with the invention.

While it is essential, as stated, to provide sufficient void space within the catalyst confining means to permit the catalyst pellets to continually change their position in the layer and with respect to one another, care must also be taken that the confining means is sufficiently filled with pellets so that the thickness of the catalyst bed remains substantially uniform under all normal operating conditions of the vehicle, including tilting, both longitudinal and lateral, to which the normally horizontal catalyst layer is subjected as the vehicle travels over an uneven road or hilly terrain. As will be explained and illustrated in more detail hereafter, this requirement may best be achieved by limiting the void space which affords the desired freedom of movement for the catalyst pellets to the minimum necessary to accomplish this purpose. In cases where the catalyst layer is of substantial area partitioning means are desirably employed to maintain uniformity of thickness by dividing the catalyst layer into a plurality of compartments through which the exhaust gases flow in parallel as will be explained more in detail hereafter.

For a better understanding of the invention, and for an illustration of its principles, reference is now made to the accompanying drawings in which:

Fig. 1 is a cross-sectional view taken along the line 1—1 of Fig. 2 showing a preferred embodiment of the invention;

Fig. 2 is a transverse cross-sectional view taken along the line 2—2 of Fig. 1;

Fig. 3 is a fragmentary view of a portion of the catalyst confining means employed in the embodiments illustrated in Figs. 1 and 2;

Figure 4A:
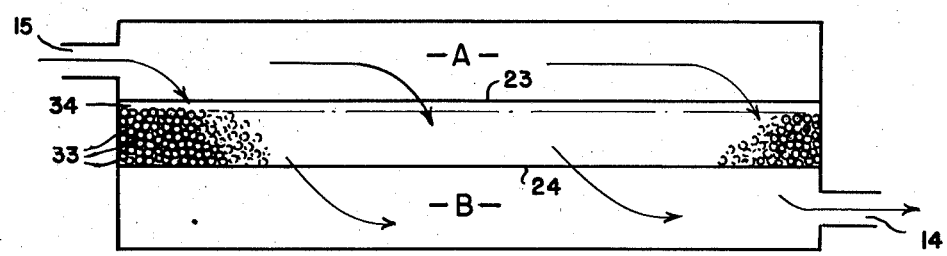
Figs. 4a, 4b, 5a and 5b are schematic representations of catalytic mufflers illustrating some of the principles of the present invention.

Referring now particularly to Figs. 1 and 2, the reference numeral 1 indicates generally a housing consisting of an elongated cylindrical metal shell 2, the open ends of which are closed by end plates 3 and 4. End plate 3 shown at the right of Fig. 1 is provided with peripheral flanges 5 which abut a complementary flange 6 on the right hand end of shell member 2. The end plate is clamped in airtight relationship to the shell member 2 by a locking member 7 in the form of a U-shaped clamping ring which is split at one portion thereof. The clamping member is provided with ears 8 at the split portions which accommodate an adjustable connection such as a machine screw 9 and nut 10 (see Fig. 2). Gasketing 11 may be interposed between the abutting flanges 6, 7, in order to insure substantial airtightness of the end plate 3. The provision of a removable end plate permits disassembly of the components of the apparatus with relative ease and speed. End plate 4, shown at the left hand side of Fig. 1, is permanently secured to shell member 2 as by welding at 12 and is provided with a reversed flange 13 which abuts the internal surface of the shell member 2. An exhaust gas outlet 14 is provided on end plate 3, and an exhaust gas inlet 15 is provided on end plate 4. Inlet 15 can be seen to consist of a diverging portion 16 and a converging portion 17, the latter portion being provided with flange 18 secured as by bolting to a mating flange 19 on exhaust pipe 20. A nozzle 20a provided on the end of pipe 20 extends within the converging portion 17 and diverging portion 16, and discharges exhaust gases in the converging portion. An air inlet 21 capped by a filter 22 admits fresh air from the atmosphere into converging portion 17. The converging and diverging portions 16, 17, the nozzle 20a, and the air inlet 21, 22, constitute a venturi inspirator, fresh air from the atmosphere being drawn into the stream of exhaust gases issuing from the nozzle 20a by the momentum of the stream of gases.

The disclosed embodiment, being provided with a venturi inspirator as shown, is particularly suited for use with internal combustion engines of the gasoline-powered spark-ignition type, particularly the 4-cycle spark-ignition gasoline engines used on most automobiles today. The exhaust from such engines contains a relatively large amount of carbon monoxide and small concentrations of oxygen as compared to other types of internal combustion engines, such as the compression-ignition type. At idle for example the exhaust from such engines may contain 8% carbon monoxide with insufficient oxygen to oxidize this high concentration and accordingly, sufficient diluting air must be mixed with the exhausted gases to provide the required oxygen and in addition to prevent the temperature of the catalyst from becoming excessively high. While the invention will be described particularly with reference to its application of engines of this type, it is understood that its application is not so limited but may also be applied to other types of internal combustion engines, such as those of the compression ignition or diesel type. In such cases, a venturi inspirator such as illustrated would be unnecessary and undesirable since diesel exhaust gases are relatively rich in oxygen and poor in combustible material.

Internally of the shell member 2 two opposed foraminous sheets indicated by the reference numerals 23, 24, are provided for receiving and retaining therebetween a layer of catalyst pellets. As clearly shown in Figs. 1 and 2, these sheets extend within the housing 1 for substantially the full length and width thereof, in opposed face-to-face relationship and divide the interior of the housing into an upper chamber A and a lower chamber B. The sheets as shown in Fig. 3 are provided over their surfaces with a great number of perforations 25a which permit the passage of exhaust gases through the apparatus. Sheets 23, 24 are preferably formed from a relatively thin gage of stainless steel and because of the fact that such thin gages of stainless steel may tend to sag under conditions of extreme temperature and load, are provided with stiffening ribs 25 extending transversely and longitudinally thereof. These ribs are pressed into the tray members and form channels on one side thereof, and protrusions on the other side as shown in Figs. 1 and 2. The tray members 23, 24 are supported along their longitudinal edges by guideways which are defined by U-shaped members 26 and brackets 27 as shown in Fig. 2. The U-shaped members 26 are secured to the internal surface of shell 2 and extend longitudinally therein in opposed relationship. The brackets 27 are similarly mounted on the internal surface of shell 2, and extend parallel to but spaced from the legs 26a of U-shaped members 26. As shown in Fig. 2, the upstanding side of each bracket 27 and the legs 26a of U-shaped members 26 define a guideway, four guideways being provided in the disclosed embodiment by the two opposed U-shaped members 26 and the four bracket members 27. The longitudinal edges of the tray members 23, 24 fit within these guideways in a relationship sufficiently tight to prevent rattling, and sufficiently rigid to provide the support necessary for the trays, but at the same time with sufficient clearance (preferably about ⅛" to ⅟₁₆") to permit the trays to expand and contract thermally independently of the housing. This relationship between the trays and the guideways is best shown by Fig. 2, which shows that the trays do not extend within the guideways to the very bases thereof, but terminate at a point which permits room for thermal expansion. As shown in Fig. 1, additional U-shaped members 28 are provided on end plates 3 and 4. These members 28 extend within the space between the opposed trays 3 and 4, and abut the underside of these sheets for the purpose of preventing the escape of catalyst pellets from the space between the opposed sheets.

According to the preferred embodiment of the invention partitioning or divider means in the form of vertical baffles 30 are provided which are secured to the top sheet 23, and which extend transversely of the longitudinal axis of shell 2, within the space between the trays. In the embodiment shown, baffles 30 are welded to the top foraminous sheet 23 and extend almost but not quite to the lower foraminous sheet 24. These baffles divide the space between the two sheets into a plurality of side-by-side compartments, for reasons which will be explained below in detail.

As may be seen, the space between the foraminous sheets 23, 24, contains a layer of catalyst pellets 33 which fills the major portion, but not the entire volume therebetween, a void space 34 being left between the top surface of the layer of catalyst pellets and the surface of the upper sheet 23. It is understood that the catalyst pellets 33 fill the entire volume between the sheets 23, 24, with the exception of the void space 34, and that for the purposes of clarity, only a portion of these pellets have been actually shown. In the embodiment illustrated, the pellets consist of small cylinders having a diameter substantially equivalent to their length.

In the particular embodiment illustrated, the catalyst pellets are charged into the space between the foraminous sheets 23, 24 through charging openings in the side of the metal housing 2 which are closed by removable plugs indicated by the reference numeral 31.

It is understood of course that many modifications in the structure of the muffler may be made within the spirit of the invention. For example, the inlet and outlet for the exhaust gases flow into the lower chamber upwardly through the catalyst layer and out from the upper chamber. Likewise, more than one layer of catalyst may be employed provided that the pressure drop through the total number of layers is not excessive. Preferably where more than one layer is employed, the layers should be arranged in parallel to the flow of exhaust gases rather than in series to minimize back-pressure on the engine. Similarly, the foraminous sheets for confining the pellets may be woven screens, or other flat foraminous structures, instead of perforated plates as shown in the drawings, although the indicated perforated plates are to be preferred.

The operation of the embodiment illustrated in the drawings as applied to a spark-ignition gasoline-powered internal combustion engine will now be described. Exhausts gases from the engine flow from exhaust pipe 20 and nozzle 20a through the constriction provided by converging portions 16 and 17, through inlet 15 into the housing 2. Through the action of this venturi arrangement, fresh air is drawn in through inlet 21 and mixed with the exhaust gases as they flow into the upper chamber A of the housing. This mixture distributes itself along the length of the upper chamber A and passes downwardly through perforations 25a in upper foraminous sheet, through the bed of catalyst pellets, then through the perforations 25a in the lower foraminous sheet into the lower chamber B and then out through the outlet 14. During their passage through the catalyst bed, carbon monoxide, hydrocarbons, aldehydes, organic acids, and other oxidizable constituents in the exhaust gas stream are catalytically oxidized at the surface of the pelleted oxidation catalyst, and passes out of the exhaust cleaner reduced in or substantially free from these obnoxious constituents which are oxidized by such treatment into carbon dioxide and water vapor. Temperature of the raw exhaust gases entering the muffler may vary from about 250° F. at idle to about 900° F. at full speed and containing carbon monoxide concentrations of the order of 4% to 8% at idle to as low as .1% at high speed, full load. To maintain high efficiency of elimination of oxidizable constituents in the exhaust stream, the operating temperature at the catalyst bed should be of the order of from 900° F. to about 1400° F.

To avoid impairing the efficiency of the engine, the catalytic muffler should impose as little as possible back-pressure on the engine. In the case of gasoline-fired spark-ignition engines, in commercial practice the back-pressure imposed should not exceed 80 inches W.C. and preferably not over 50 inches W.C. While complying with this limitation, it is at the same time necessary to supply sufficient catalytic surface to promote efficient oxidation of the combustible material in the exhaust gas stream. As an example, it has been determined that for an average automotive type engine of 216.5 cubic inches' piston displacement, and using pellets of alumina impregnated with finely divided platinum, about 11,000 square inches of catalyst surface is required to provide efficient elimination. Using pellets 3/32" in diameter and of about the same length, about 4,000 cc. (dumped volume) of these pellets are required to provide this mount of catalytic surface. Entirely satisfactory results with respect to back-pressure on the engine may be obtained by disposing this volume of such catalyst pellets in a layer about 2½ inches in thickness, 7 inches in width and about 22 inches in length. (Total surface area of layer equals 154 square inches.)

Generally speaking, the thickness of the catalyst layer in accordance with the invention should not exceed 5 inches and should preferably be of the order of from ¾ inch to 2½ inches. Having chosen the desired thickness within these limits, the required amount of catalytic surface should be provided by increasing the lateral and longitudinal dimensions of the catalyst layer.

In use, the muffler housing is of course attached to the vehicle and may conveniently take the same place as the conventional acoustical muffler under the chassis of the vehicle. When thus attached to this or some other convenient portion of the vehicle, the muffler housing is subjected to all the vibration, jars, shocks, tilting, and sudden movement accompanying the operation of the vehicle in its travel over the road. These jars, shocks, tilting, and other movement are transmitted to the layer of catalyst pellets through the muffler housing causing them to undergo continual displacement within the confines of the foraminous plates 23, 24. The void space 34 purposely left between the plates 23, 24 permits movement which is much freer and more extensive than that which would occur were the space between the foraminous sheets 23, 24 filled to capacity with catalyst pellets. In this latter case, the pellets would be free, by virtue of the natural insterstitial voids inherent in any random packing of the catalyst container, to undergo a limited to and fro movement with little or only a very slow change of the position of the pellet in the layer or with respect to other pellets. In contrast to this limited type of movement, the void space 34 (which is illustrated diagrammatically, and not necessarily in scale) is sufficient to permit the catalyst pellets, considering their size, shape and other characteristics, to freely change their position in the bed and their position and/or orientation with respect to one another with each jar to which the housing apparatus is constantly subjected and in response to the flow of gases through the bed. Thus, within a period of time, under the influence of engine and road vibration, exhaust gas flow, etc., individual pellets may change their position in the bed from the top to the bottom thereof, or vice versa, or travel laterally or longitudinally for a distance of several inches. This free movement and "semi-fluid" condition of the bed is greatly enhanced by the use of pellets having smooth and rounded surfaces and of substantially uniform shape and size, and in the size range previously indicated. Under such conditions, the bed of pellets, although in constant motion during operation of the vehicle, maintains a constant and uniform permeability and accordingly provides the desired uniform flow of the exhaust gases through all portions of the catalyst layer.

As indicated heretofore, care must be taken to limit the amount of void space within the catalyst confining means so as to avoid a tendency toward non-uniformity in the thickness of the catalyst bed which of course is also of prime importance with respect to maintaining the uniform permeability thereof. In carrying out catalyst reactions under ordinary conditions, the catalyst bed, when of the fixed bed type, remains substantially stationary during operation, and accordingly, after the catalyst has been arranged in place, there is little tendency thereafter for the catalyst to become unevenly dispersed within the catalyst container. In the case of a catalytic muffler however attached to a moving vehicle, the catalyst bed is subjected to all the vibrations, jars, tilting and other types of movement to which the chassis of the vehicle is subjected as the vehicle passes over the road.

The effect of such movement upon a catalyst layer where void space has been left within the catalyst containing means is diagrammatically illustrated in Figs. 4a, 4b, 5a and 5b. In these figures such a catalyst layer is shown installed in a muffler of the type illustrated in Figs.

1 to 3, exhaust gases entering the upper chamber A through inlet 15, passing through the foraminous retaining means 23, 24, through the layer of catalyst, into the lower chamber B and out through outlet 14. Assuming that the vehicle is at a standstill on a level road and that the catalyst layer is for the moment spread out uniformly, a layer of catalyst pellets 33 of substantially uniform thickness will be presented to the exhaust gases with a substantially uniform void space 34 over the catalyst bed as shown in Fig. 4a.

Figure 4B:
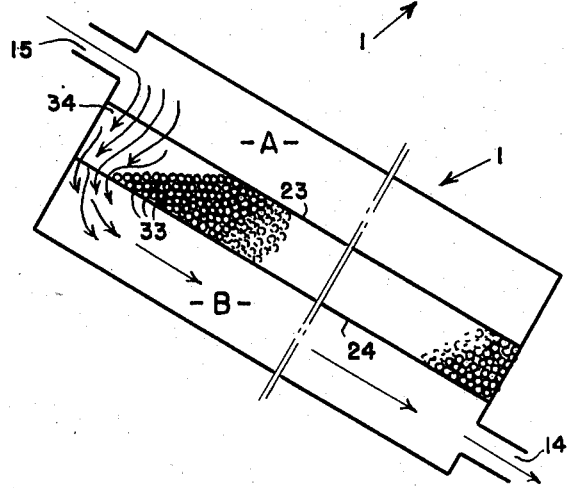

Should however the vehicle be traveling down a grade, the catalyst layer would immediately assume the arrangement as shown in Fig. 4b where the catalyst pellets have migrated toward the low end of the muffler, leaving a thin layer, or perhaps leaving a section of the catalyst container completely devoid of catalyst, at the high end. In such case, a large portion of the exhaust gases would by-pass the main portion of the bed and flow through the path of low resistance thus afforded. While these representations are schematic and not necessarily in scale, they serve to illustrate the principle involved.

Figure 5A:
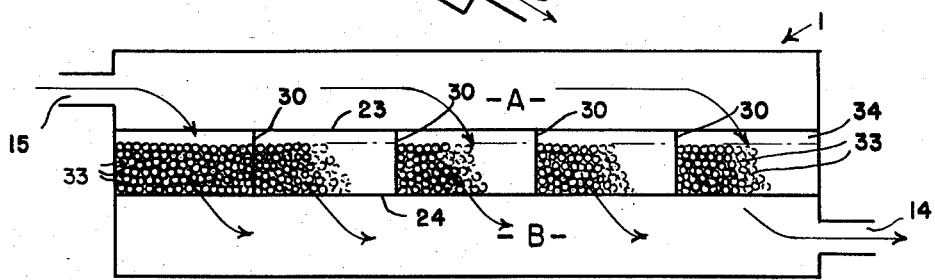
Figure 5B:
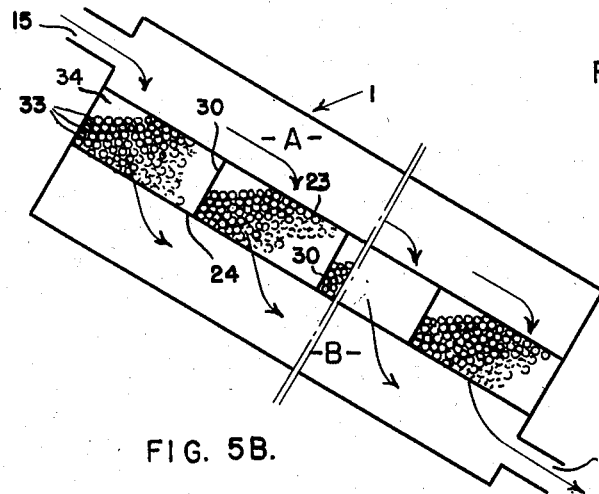

In catalytic mufflers for automotive engines of the usual size, a considerable area of catalyst layer will ordinarily be required, such as an area of 154 square inches as in the example given above. In catalytic mufflers of this size and so arranged, the amount of void space between the confining foraminous sheets required to give the necessary freedom of movement for the catalyst pellets will ordinarily be such that if the catalyst pellets are arranged in one continuous and unobstructed layer such as illustrated in Figs. 4a and 4b, non-uniformity of bed thickness will result under operating conditions as schematically illustrated in these figures. To avoid this it has been found necessary to divide the catalyst layer into a plurality of compartments by the use of partitioning or divider means as illustrated in Figs. 5a and 5b. As illustrated in these figures, the partitioning means in the form of vertical baffles 30 extending transversely of the catalyst layer, divide the space within the catalyst confining means into a plurality of side-by-side compartments through which the exhaust gases flow in parallel as illustrated in Figs. 5a and 5b. Fig. 5b shows effect of the partitions when the muffler is subjected to tilting or other movement causing the catalyst pellets to migrate to one section of the muffler. As illustrated in this figure, the non-uniformity of the thickness of the layer is greatly minimized by the use of the partitions. The number and spacing of the partitions 30 necessary to maintain a substantially uniform bed thickness under all conditions of operation can be determined in any particular case by simple experiment. The larger the area of the layer and the larger the amount of void space permitted, the larger the number of partition means will be required.

With respect to the arrangement and disposition of the partitions, it is preferable to arrange the catalyst pellets in a relatively elongated layer as in the embodiment illustrated in the drawings and to limit the width of the layer such that longitudinal partitions will not be required. In such case, only a series of partitions transverse to the longitudinal axis will be required, as shown in the drawings, which greatly simplifies charging and emptying operations in contrast to a partitioning system involving both longitudinal and transverse partitions.

Preferably, to avoid using a large number of partitions, the minimum amount of void space within the catalyst confining means should be allowed which will provide the required freedom of movement of the catalyst pellets. This may be determined easily by experiment in any particular set of conditions. For example, it has been determined that in a case where foraminous retaining sheets 7 inches wide and 22 inches long were employed, where the vertical distance between the foraminous retaining sheets was 2½ inches, and where cylindrical pellets 3/32 inch in diameter and of substantially the same length were used, the required freedom of movement of the catalyst pellets could be obtained by filling the catalyst receiving space to capacity with catalyst pellets (the filling operation being assisted by the use of light tapping on the catalyst housing), and after thus filling to capacity, removing approximately 5% by weight of the catalyst pellets to provide the required void space. In this case four transverse vertical baffles such as baffles 30, spaced 4½ inches apart along the length of the catalyst layer were used to maintain substantial uniformity of bed thickness. In any other particular case, the proper charge of catalyst pellets into the confining space and the required number of baffles can be determined experimentally by gradually removing pellets after filling to capacity and observing the behavior of the pellet layer under operating conditions.

The catalyst pellets making up the layer may be composed of any suitable material which affords a reasonably active and durable oxidation catalyst. Pellets composed of a catalytic or adsorptive form of alumina and impregnated with a small amount for example from 0.08 to 0.4 percent by weight of a metal such as platinum, palladium, silver, copper, nickel or combinations such as copper-chromium, silver-chromium, have been found to provide a catalyst of excellent and sustained activity at the temperatures of operation necessary to provide efficient purification of the exhaust gases. The alumina pellets should desirably be prepared in a manner such as to impart high resistance to attrition which is retained at high temperature of operation. Attrition resistance is particularly important in view of the constant movement and impact to which the pellets are subjected during operation of the vehicle. Not only is it important from the standpoint of avoiding loss of expensive catalytic material but also from the standpoint of maintaining the original shape and uniform size of the catalyst pellets which in turn is important as pointed out previously for maintaining a catalyst bed of uniform permeability. While catalysts of this type are highly desirable, it is understood on the other hand that the invention is not necessarily limited to any particular type of catalytic material.

It is to be further understood that the above description and accompanying drawings are intended to be illustrative of the invention and that the scope of the invention is not limited to the specific embodiments described and illustrated but is to be determined by reference to the scope of the appended claims.

This application is a continuation-in-part of copending application Serial Number 219,623 filed April 6, 1951, now Patent No. 2,772,147, by William M. Bowen III and Eugene J. Houdry for Catalytic Operations, and of copending application Serial Number 225,498, filed May 10, 1951, now Patent No. 2,747,976, by Eugene J. Houdry for Surface Type Catalysis.

I claim:

1. Catalytic exhaust cleaner for vehicles powered by internal combustion engines for purifying by catalytic oxidation exhaust gases therefrom comprising a housing suited for attachment to said vehicle through which said exhaust gases flow, catalyst confining means comprising a pair of opposed foraminous sheets horizontally mounted in said housing and containing therebetween a layer of small catalyst pellets having smooth and rounded surfaces, said layer having a thickness which is small relative to the lateral and longitudinal dimensions of said layer said pellets occupying the major portion of but not the entire volume between said foraminous sheets, sufficient free space existing therebetween to permit said catalyst pellets to continually change their position in said layer and relative to one another in response to the vibration and movement to which said housing is subjected during operation of the vehicle, baffles mounted between said foraminous sheets for dividing said layer of catalyst pellets into a plurality of horizontally spaced compartments through which said exhaust gases flow in parallel, said vertical baffles serving to maintain said layer of substantially uniform thickness by preventing excessive migration of said catalyst pellets to one portion of said confining means under the influence of the vibration and movement of the vehicle.

2. Catalytic exhaust cleaner for vehicles powered by internal combustion engines for purifying by catalytic oxidation exhaust gases therefrom comprising an elongated housing suited for attachment to said vehicle through which said exhaust gases flow, catalyst confining means mounted in said housing in the path of exhaust gases flowing therethrough, said confining means comprising a pair of opposed foraminous sheets arranged horizontally within said housing and extending laterally and longitudinally for substantially the full length and width thereof, said foraminous sheets containing therebetween a layer of small catalyst pellets having smooth and rounded surfaces, said layer having a thickness which is small relative to the lateral and longitudinal dimensions of said layer said pellets occupying the major portion of but not the entire volume between said foraminous sheets, sufficient free space existing therebetween to permit said catalyst pellets to continually change their position in said layer and relative to one another in response to the vibrations and movement to which said housing is subjected during operation of the vehicle, vertical baffles contained between said opposed foraminous sheets and extending substantially transversely of the longitudinal axis of said housing, and dividing said layer of catalyst pellets into a plurality of side-by-side compartments, said baffles serving to maintain said layer of pellets of substantially uniform thickness by preventing excessive migration of said pellets to one portion of the confining means under the influence of the vibration and movement of the vehicle.

References Cited in the file of this patent

UNITED STATES PATENTS

| | | |
|---|---|---|
| 1,522,111 | Franck-Philipson | Jan. 6, 1925 |
| 1,867,325 | Neville | July 12, 1932 |
| 2,339,882 | Savage | Jan. 25, 1944 |
| 2,828,189 | Houdry | Mar. 25, 1958 |

FOREIGN PATENTS

| | | |
|---|---|---|
| 439,766 | Great Britain | Dec. 13, 1935 |